US012647636B2

(12) United States Patent
Suzuki et al.

(10) Patent No.: US 12,647,636 B2
(45) Date of Patent: Jun. 2, 2026

(54) VIDEO IMAGE DISTRIBUTION APPARATUS, VIDEO IMAGE DISTRIBUTION SYSTEM, VIDEO IMAGE DISTRIBUTION METHOD, AND COMPUTER-READABLE MEDIUM

(71) Applicant: NEC Corporation, Tokyo (JP)

(72) Inventors: Keisuke Suzuki, Tokyo (JP); Yasuhiro Mizukoshi, Tokyo (JP); Takashi Yamane, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/683,803

(22) PCT Filed: Aug. 30, 2021

(86) PCT No.: PCT/JP2021/031687
§ 371 (c)(1),
(2) Date: Feb. 15, 2024

(87) PCT Pub. No.: WO2023/031989
PCT Pub. Date: Mar. 9, 2023

(65) Prior Publication Data
US 2025/0126315 A1 Apr. 17, 2025

(51) Int. Cl.
*H04N 21/2662* (2011.01)
*H04N 21/234* (2011.01)
(52) U.S. Cl.
CPC ....... *H04N 21/2662* (2013.01); *H04N 21/234* (2013.01)
(58) Field of Classification Search
None
See application file for complete search history.

(56) References Cited

U.S. PATENT DOCUMENTS

| | | | |
|---|---|---|---|
| 11,968,412 B1 * | 4/2024 | Brailovskiy | H04N 7/183 |
| 2021/0218954 A1 | 7/2021 | Wang et al. | |
| 2023/0007276 A1 * | 1/2023 | Adzic | H04N 19/167 |
| 2023/0086245 A1 * | 3/2023 | Ma | G06T 9/20 |
| | | | 345/660 |

FOREIGN PATENT DOCUMENTS

| | | |
|---|---|---|
| JP | H09-214968 A | 8/1997 |
| JP | 2006-279283 A | 10/2006 |
| WO | 2019/044065 A1 | 3/2019 |

OTHER PUBLICATIONS

International Search Report for PCT Application No. PCT/JP2021/031687, mailed on Nov. 16, 2021.
Japanese Office Action for JP Application No. 2023-544797 mailed on Jan. 7, 2025 with English Translation.

* cited by examiner

*Primary Examiner* — Junior O Mendoza
(74) *Attorney, Agent, or Firm* — Sughrue Mion, PLLC

(57) ABSTRACT
To suppress deterioration in accuracy of prediction of a communication throughput. A video image distribution apparatus includes: a pixel shifting unit for changing pixel values of pixels in a captured video image when a volume of data after encoding the captured video image is small; an encoding unit for encoding the captured video image; a transmission unit for transmitting the encoded captured video image; and a prediction unit for predicting a communication throughput using an effective throughput of transmission of the captured video image.

6 Claims, 5 Drawing Sheets

VIDEO IMAGE DISTRIBUTION APPARATUS, VIDEO IMAGE DISTRIBUTION SYSTEM, VIDEO IMAGE DISTRIBUTION METHOD, AND COMPUTER-READABLE MEDIUM

This application is a National Stage Entry of PCT/JP2021/031687 filed on Aug. 30, 2021, the contents of all of which are incorporated herein by reference, in their entirety.

TECHNICAL FIELD

The present disclosure relates to a video image distribution apparatus, a video image distribution system, a video image distribution method, and a computer-readable medium.

BACKGROUND ART

A technique for predicting a communication throughput and achieving optimal video image distribution has been proposed. In such a technique, a communication throughput is predicted while performing distribution of video images, and based on the result of prediction, the bit rate and the frame rate of the video images are optimized. As a result, video images are stably transmitted without being interrupted.

In such a technique, a communication throughput is predicted using the effective throughput of video image transmission. This causes a problem in that accuracy of prediction of a communication throughput declines as the bit rate of video image transmission is lowered when there is room in the communication line.

Note that Patent Literature 1 discloses a technique related to a server for performing streaming.

CITATION LIST

Patent Literature

Patent Literature 1: Japanese Unexamined Patent Application Publication No. 2006-279283

SUMMARY OF INVENTION

Technical Problem

As described above, there was a problem that the accuracy of prediction of a communication throughput declined in a video image distribution system.

In view of the above circumstances, an object of the present disclosure to provide a video image distribution apparatus, a video image distribution system, a video image distribution method, and a computer-readable medium each adapted to suppress decline in accuracy of prediction of a communication throughput.

Solution to Problem

In order to achieve the above object, the present disclosure provides a video image distribution apparatus including:

pixel shifting means for changing pixel values of pixels in a captured video image when a volume of data after encoding the captured video image is small;
encoding means for encoding the captured video image;
transmission means for transmitting the encoded captured video image; and prediction means for predicting a communication throughput using an effective throughput of transmission of the captured video image.

The present disclosure provides a video image distribution system including:
a video image distribution apparatus; and
a reception apparatus,
in which the video image distribution apparatus is configured to:
change a pixel value of at least one pixel in a captured video image when a volume of data after encoding the captured video image is small;
encode the captured video image;
transmit the encoded captured video image to the reception apparatus; and
predict a communication throughput using an effective throughput of transmission of the captured video image.

The present disclosure provides a video image distribution method implemented by a computer, the method including:
changing a pixel value of pixels in a captured video image when a volume of data after encoding the captured video image is small;
encoding the captured video image;
transmitting the encoded captured video image; and
predicting the communication throughput using an effective throughput of transmission of the captured video image.

The present disclosure provides a non-transitory computer-readable medium storing a program for causing a computer to execute processes of:
changing pixel values of pixels in a captured video image when a volume of data after encoding the captured video image is small;
encoding the captured video image;
transmitting the encoded captured video image; and predicting a communication throughput using an effective throughput of transmission of the captured video image.

Advantageous Effects of Invention

A video image distribution apparatus, a video image distribution system, a video image distribution method, and a computer-readable medium according to the present disclosure is each adapted to suppress decline in accuracy of prediction of a communication throughput.

EXAMPLE EMBODIMENT

Figure 1:
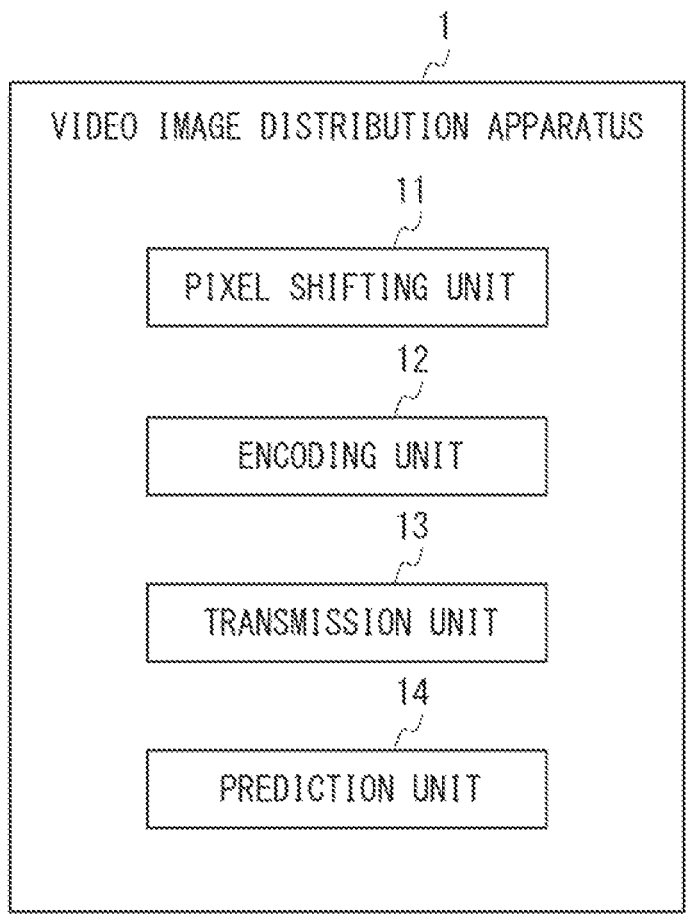
FIG. 1 is a block diagram showing a video image distribution apparatus related to a first example embodiment.

Hereinafter, example embodiments of the present disclosure will be described in detail with reference to the drawings. In each drawing, the same or corresponding elements have the same reference numerals, and duplicate descriptions thereof are omitted as necessary for clarity of the description.

First Example Embodiment

FIG. 1 is a block diagram showing an overall configuration of a video image distribution apparatus 1 according to a first example embodiment. The video image distribution apparatus 1 is a computer that performs communication throughput prediction (bandwidth prediction) based on the effective throughput of video image distribution. The video image distribution apparatus 1 is connected to a reception apparatus (not shown) that receives a video image via a network (not shown). The network (not shown) may be wired or wireless. The video image distribution apparatus 1 transmits a video image captured by, for example, a dashcam or a surveillance camera to a reception apparatus (not shown). The video image distribution apparatus 1 includes a pixel shifting unit 11, an encoding unit 12, a transmission unit 13, and a prediction unit 14.

The pixel shifting unit 11 changes the pixel values of the pixels in the captured video image when the volume of data after encoding the captured video image is small. When the captured video image is a moving image, the pixel shifting unit 11 may change the pixel values of the pixels in a frame (hereinafter also referred to as a captured image). The process of changing the pixel values of the pixels in the captured video image is also referred to as pixel shifting processing. For example, when the captured video image becomes solid black at night etc., pixel shifting processing is performed because the volume of data after encoding the captured video image is small. The pixel shifting unit 11 may select, for example, a number of pixels corresponding to a hit rate from all pixels included in the captured image and change the pixel values of the selected pixels according to a shift width.

The encoding unit 12 encodes the captured video image. When pixel shifting processing is performed, the encoding unit 12 encodes the captured video image which has been subjected to pixel shifting processing and the encoding unit 12 encodes the captured video image as it is when the captured video image is not subjected to pixel shifting processing. The encoding unit 12 may encode the captured video image according to the target bit rate based on the result of prediction by the prediction unit 14, which will be described later.

The transmission unit 13 transmits the captured video image encoded by the encoding unit 12 to a reception apparatus (not shown). The prediction unit 14 predicts a communication throughput (bandwidth prediction) using the effective throughput of the transmission of the captured video image. Here, the reception apparatus (not shown) may feedback the effective throughput to the video image distribution apparatus 1.

In this way, the image distribution apparatus of the present example embodiment changes the pixel values of the pixels in the video image when the volume of data after encoding the captured video image is small. Thus, it is possible to prevent decrease in the effective throughput of transmission, whereby it is possible to suppress decline in accuracy of prediction of a communication throughput.

The video image distribution apparatus 1 includes a processor, a memory, and a storage device, which is a configuration not shown in the drawings. The storage device also stores a computer program for implementing processing of the information processing method of the present example embodiment. The processor reads a computer program from the storage device into the memory and executes the computer program. Thus, the processor realizes the functions of the pixel shifting unit 11, the encoding unit 12, the transmission unit 13, and the prediction unit 14.

Alternatively, the pixel shifting unit 11, the encoding unit 12, the transmission unit 13, and the prediction unit 14 may each be implemented with dedicated hardware. In addition, some or all of the components of each apparatus may be implemented with a general-purpose or dedicated circuit, a processor, or the like, or a combination thereof. These may be configured with a single chip or with a plurality of chips connected via a bus. Some or all of the components of each apparatus may be implemented by a combination of the above-mentioned circuits, etc., and a program. A CPU (Central Processing Unit), a GPU (Graphics Processing Unit), an FPGA (field-programmable gate array), a quantum processor (quantum computer control chip), etc., may be used as a processor.

In addition, when some or all of the components of the video image distribution apparatus 1 are realized by a plurality of information processing apparatuses, circuits, etc., the plurality of information processing apparatuses, circuits, etc. may be centrally arranged or distributed. For example, the information processing apparatus, the circuit, and the like may be realized in the form of a client-server system, a cloud computing system, and the like, each of which is connected to one another through a communication network. In addition, the function of the video image distribution apparatus 1 may be provided in the Saas (Software as a Service) format.

Second Example Embodiment

A second example embodiment is a specific example of the first example embodiment described above. A video image distribution system according to a second example embodiment uses a technology called adaptive network technology to predict a communication throughput while distribution a video image and optimizes the bit rate and the frame rate of the video image based on the result of prediction.

Figure 2:
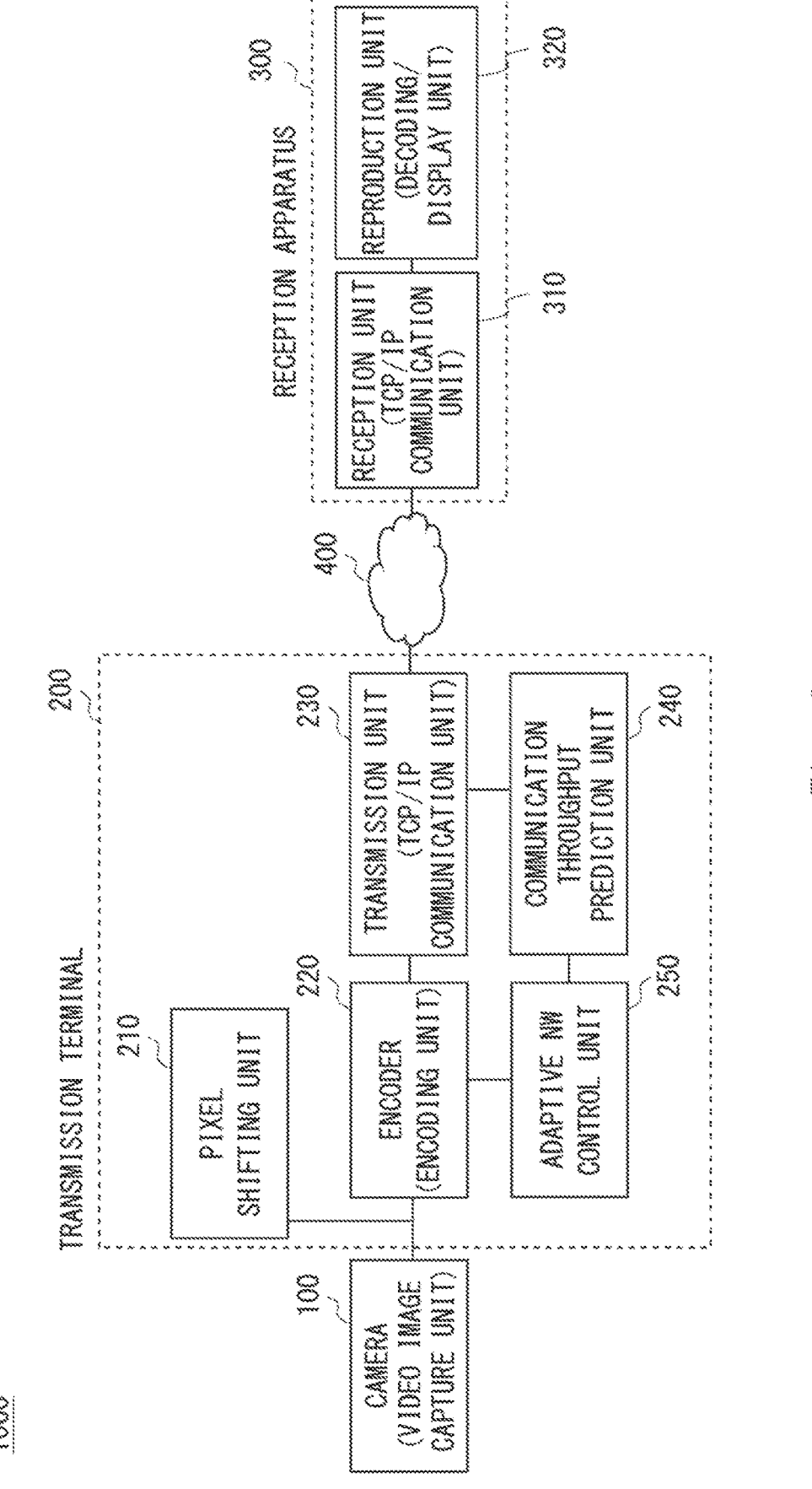
FIG. 2 is a block diagram showing a video image distribution system according to a second example embodiment.

FIG. 2 is a block diagram showing the configuration of a video image distribution system 1000 according to the second example embodiment. The video image distribution system 1000 includes a camera 100, a transmission terminal 200, and a reception apparatus 300. The transmission terminal 200 and the reception apparatus 300 are connected with each other via a network 400. The network 400 includes, for example, a network using a communication line standard such as LTE (Long Term Evolution), WiFi (registered trademark), or a wireless communication network such as a 5th generation mobile communication system.

The camera 100 is also referred to as a video image capture unit. The camera 100 captures the captured video image. The video image distribution system 1000 may include a plurality of cameras 100.

The transmission terminal 200 is a specific example of the video image distribution apparatus 1 described above. The transmission terminal 200 includes a pixel shifting unit 210, an encoder 220, a transmission unit 230, a communication throughput prediction unit 240, and an adaptive network control unit 250. The transmission terminal 200 may be an in-vehicle terminal installed in a vehicle.

The pixel shifting unit 210 is a specific example of the pixel shifting unit 11 described above. The pixel shifting unit 210 performs pixel shifting processing when the volume of data after encoding the video image captured by the camera 100 becomes minimal.

Specifically, pixel shifting processing is performed when the captured video image is a simple or uniform image such as a solid black one. For example, when the camera 100 is covered with a hand or a cloth, the captured video image turns out to be a simple video image. In the case of a dashcam, the video image captured at night may become a simple video image. In such a case, the volume of the encoded data becomes minimal, and the transmission bit rate is lowered.

Details of pixel shifting processing will be described below. The conditions under which pixel shifting processing is executed will be described later. The pixel shifting unit 210 first determines whether or not each pixel included in the captured image is one which should be subjected to shifting processing. The pixel shifting unit 210 selects a number of pixels calculated by the product of the number of vertical pixels (height), the number of horizontal pixels (width), and the hit rate (%). The hit rate may be set in advance. The pixel shifting unit 210 may randomly select (extract) the object of pixel shifting processing.

Next, the pixel shifting unit 210 changes the pixel value of each selected pixel. When the RGB (Red Green Blue) value of the selected pixel is smaller than the threshold value (for example, 128 if the maximum value is 255), the pixel shifting unit 210 adds the shift width to the RGB value. As a result, the selected pixel become slightly brighter. In addition, when the RGB value of the selected pixel is equal to or greater than the threshold value (for example, 128 if the maximum value is 255), the pixel shifting unit 210 subtracts the shift width from the RGB value.

As a specific example of pixel shifting processing, a case where pixel shifting processing is performed for pixels whose RGB value is (232, 108, 55) will be described. 232 is greater than 128, 108 is less than 128, and 55 is less than 128. Thus, when the shift width is 1, the pixel shifting unit 210 changes the RGB value (232, 108, 55) to RGB value (231, 109, 56).

As a result of pixel shifting (for example, a hit rate 0.1%, a shift width 64), the captured image becomes an image with a partial noise. The hit rate and the shift width may be set appropriately according to the use case. When the hit rate is high, the processing load is high because many pixels are subject to pixel shifting processing. On the other hand, when the shift width is large, the amount of change in the pixel value is large, and the effect on the appearance of the image is large.

For example, when the camera 100 is a fixed surveillance camera, it is important that the contents of the image not be damaged. In such a case, a high hit rate (e.g., 30%) is set and a low shift width (e.g., 1) is set. In addition, when the camera 100 is a dashcam, real-time performance is emphasized. In such a case, a low hit rate (e.g., 0.3%) is set and a high shift width (e.g., 24) is set.

The encoder 220 is a specific example of the encoding unit 12 described above and is also referred to as an encoding unit. The encoder 220 encodes a video image captured by the camera 100. When the pixel shifting processing is performed on a captured video image, the encoder 220 encodes the captured video image which has been subjected to pixel shifting processing. The encoder 220 performs encoding according to the bit rate and the frame rate determined by the adaptive network control unit 250 described later.

The transmission unit 230 is a specific example of the transmission unit 13 described above and is also referred to as a TCP/IP communication unit. The transmission unit 230 transmits the captured video image encoded by the encoder 220 to the reception apparatus 300.

The communication throughput prediction unit 240 is a specific example of the prediction unit 14 described above and predicts the future communication throughput (bandwidth prediction). The communication throughput prediction unit 240 receives the effective throughput from the reception apparatus 300 and predicts a communication throughput.

The adaptive network control unit 250 optimizes the video image bit rate and the frame rate according to a communication throughput prediction performed by the communication throughput prediction unit 240. The adaptive network control unit 250 may assign a bit rate or the like to each of the plurality of cameras 100. The adaptive network control unit 250 outputs the target bit rate of the video image to the encoder.

The reception apparatus 300 includes a reception unit 310 and a reproduction unit 320. The reception unit 310, also referred to as a TCP/IP communication unit, receives a video image from the transmission terminal 200. The reproduction unit 320, also referred to as a decoding/display unit, decodes the received video image and displays it on a display device such as a display.

When the bit rate of the video image is lowered, the video image distribution system 1000 compensates for the data loss by performing pixel shifting processing. Therefore, even when the volume of data after encoding the video image becomes minimal, it is possible to prevent the prediction value from being lowered, whereby decline in the accuracy of bandwidth prediction can be prevented. In addition, since the video image distribution system 1000 slightly changes the captured image, it is possible to ease the sense of incongruity of a viewer and reduce data loss when the video image is viewed.

Figure 3:
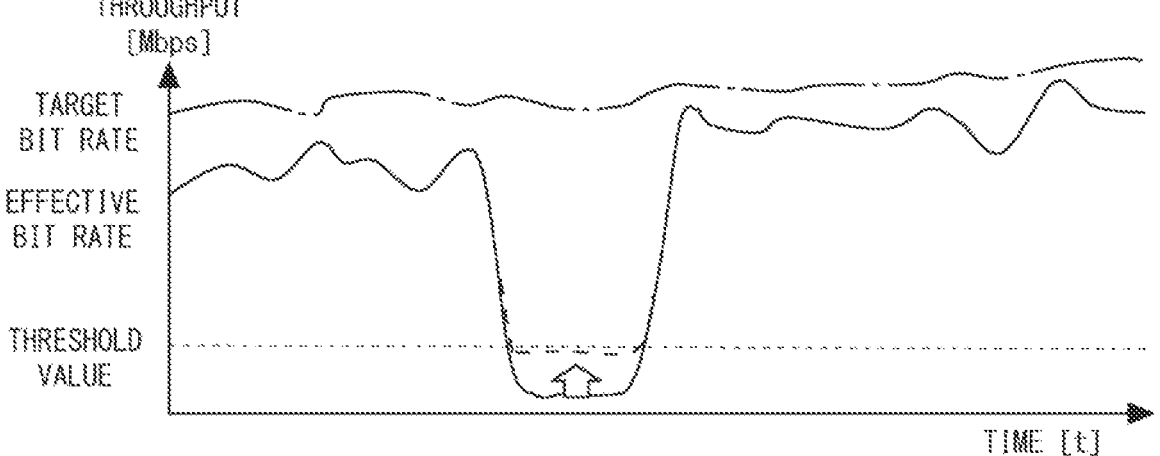
FIG. 3 is schematic diagram schematically showing conditions under which pixel shifting processing is executed.

Next, referring to FIG. 3, conditions under which pixel shifting processing is performed will be described. FIG. 3 is a schematic diagram schematically showing the change over time of the target bit rate determined by the adaptive network control unit 250 and the bit rate (also referred to as an effective bit rate) of the most recently (i.e., the latest) encoded captured video image.

In FIG. 3, the horizontal axis indicates time [t], and the vertical axis indicates throughput [Mbps]. The change over time of the target bit rate is shown by a dash-dot line, and the change over time of the effective bit rate is shown by a solid line. In practice, when the effective bit rate is lowered, the target bit rate is lowered, but for the sake of clarity, the target bit rate shown in FIG. 3 is not lowered.

The transmission terminal 200 executes pixel shifting processing based on a result of comparison of the bit rate (effective bit rate) of the most recently encoded captured video image with the target bit rate. Specifically, the transmission terminal 200 performs pixel shifting processing when the following two conditions (A) and (B) are satisfied. (A) The bit rate (effective bit rate) of the most recently encoded captured video image is smaller than a threshold value (e.g., 1.0 Mbps). (B) The bit rate (effective bit rate) of the most recently encoded captured video image is smaller than the product of the target bit rate and a predefined rate (e.g., 0.5). When these conditions are satisfied, the transmission terminal 200 performs pixel shifting processing to bulk up the volume of data to near the threshold value as indicated by the upward arrow, thereby preventing the bandwidth prediction value from being lowered.

Next, the results of verification conducted by the inventors will be described with reference to FIGS. 4 and 5. The resolution of the video image was set to 1280×720, the hit rate was set to 0.3%, and the shift width was set to 24. The conditions under which pixel shifting processing is performed were the effective bit rate of 2.0 Mbps or less and 50% or less of the target bit rate. In the captured video image for verification, a frame of only a black image was inserted during the period from 15 to 35 seconds after the start.

Figure 4:
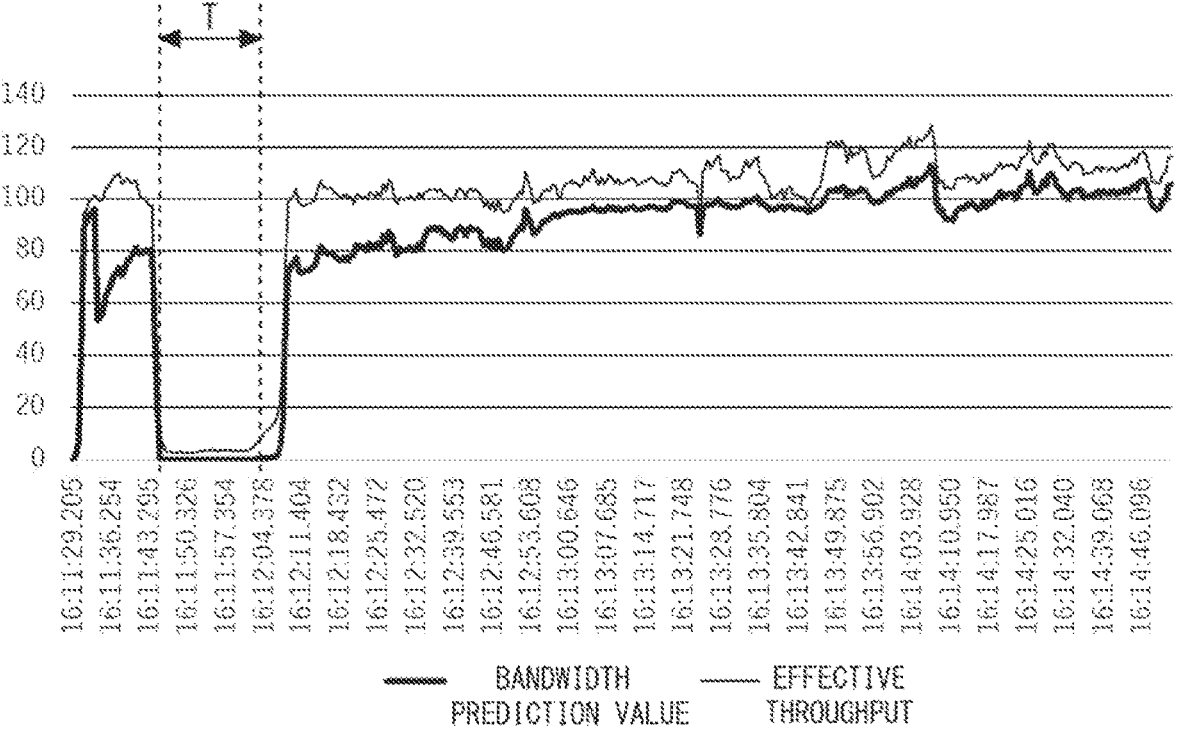
FIG. 4 is a graph showing a result of prediction of a communication throughput when pixel shifting processing is not performed.

FIG. 4 is a graph showing the change over time of the bandwidth prediction value (a communication throughput prediction value) and the effective throughput when pixel shifting processing is not performed. The horizontal axis indicates time, and the vertical axis indicates throughput. The section indicated by T represents the section where a frame of a black image is inserted. As the measured throughput decreases, the bandwidth prediction value is also lowered significantly. In addition, it takes time for the bandwidth prediction value to resume its original value after the end of the interval indicated by T.

Figure 5:
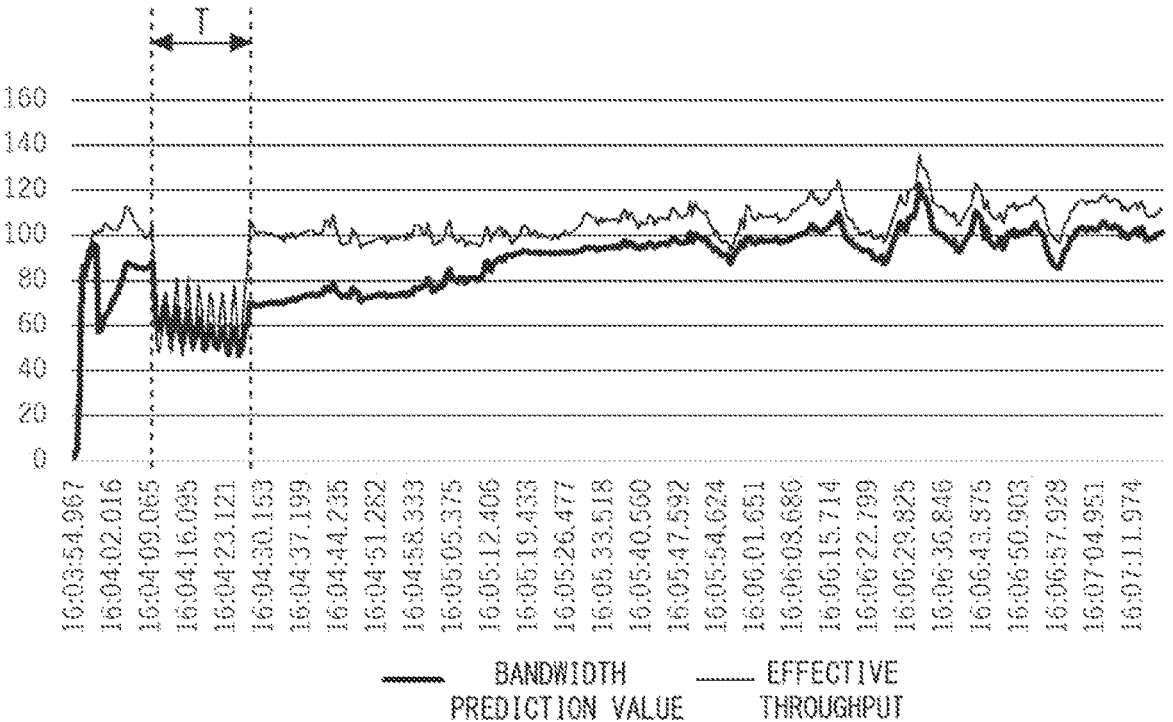
FIG. 5 is a graph showing a result of prediction of a communication throughput when pixel shifting processing is performed.

FIG. 5 is a graph showing the change over time of the bandwidth prediction value and the effective throughput when pixel shifting processing is performed. The horizontal axis indicates time, and the vertical axis indicates throughput. The section indicated by T represents the section where a frame of a black image is inserted. When pixel shifting processing is performed, the reduction in the effective throughput is suppressed, whereby lowering of the bandwidth prediction value is also suppressed. In addition, the bandwidth prediction value is quickly restored after the end of the interval indicated by T.

The video image distribution system according to the second example embodiment bulks up the volume of data without greatly impairing the visual appearance of the captured video image. Therefore, video image distribution system according to the second example embodiment can maintain the accuracy of bandwidth prediction even in an environment where the volume of data of the video image becomes minimal.

Although example embodiments of the present disclosure have been described above in detail, the present disclosure is not limited to the above-described example embodiments, and changes or modifications made to the example embodiments described above are included in the present disclosure to the extent that they do not deviate from the purpose of the present disclosure.

REFERENCE SIGNS LIST

1: VIDEO IMAGE DISTRIBUTION APPARATUS
11: PIXEL SHIFTING UNIT
12: ENCODING UNIT
13: TRANSMISSION UNIT
14: PREDICTION UNIT
1000: VIDEO IMAGE DISTRIBUTION SYSTEM
100: CAMERA
200: TRANSMISSION TERMINAL
210: PIXEL SHIFTING UNIT
220: ENCODER
230: TRANSMISSION UNIT
240: COMMUNICATION THROUGHPUT PREDICTION UNIT
250: ADAPTIVE NETWORK CONTROL UNIT

8

300: RECEPTION APPARATUS
310: RECEPTION UNIT
320: REPRODUCTION UNIT
400: NETWORK

What is claimed is:

1. A video image distribution apparatus comprising:
at least one memory storing instructions and
at least one processor configured to execute the instructions to:
change pixel values of pixels in a captured video image when a volume of data after encoding the captured video image is small, by selecting a number of the pixels corresponding to a hit rate and changing the pixel values of the selected pixels according to a shift width;
encode the captured video image;
transmit the encoded captured video image; and
predict a communication throughput using an effective throughput of transmission of the captured video image.

2. The video image distribution apparatus according to claim 1, wherein the at least one processor is further configured to execute the instructions to:
add the shift width to the pixel values when the pixel values of the selected pixels are smaller than the threshold value; and
subtract the shift width from the pixel values when the pixel values of the selected pixels are equal to or greater than the threshold value.

3. The video image distribution apparatus according to claim 1, wherein the at least one processor is further configured to execute the instructions to:
encode the captured video image according to a target bit rate based on a result of prediction; and
change a pixel value of pixels in the captured video image based on a result of comparison of the bit rate of the most recently encoded captured video image with the target bit rate.

4. The video image distribution apparatus according to claim 3, wherein the at least one processor is further configured to execute the instructions to:
change the pixel value of pixels in the captured video image when the bit rate of the most recently encoded captured video image is equal to or less than a predefined rate of the target bit rate and is equal to or less than a threshold value.

5. A video image distribution method implemented by a computer, the method comprising:
changing a pixel value of pixels in a captured video image when a volume of data after encoding the captured video image is small, by selecting a number of the pixels corresponding to a hit rate and changing the pixel values of the selected pixels according to a shift width;
encoding the captured video image;
transmitting the encoded captured video image; and
predicting the communication throughput using an effective throughput of transmission of the captured video image.

6. A non-transitory computer-readable medium storing a program for causing a computer to execute processes of:
changing a pixel value of pixels in a captured video image when a volume of data after encoding the captured video image is small, by selecting a number of the pixels corresponding to a hit rate and changing the pixel values of the selected pixels according to a shift width;

encoding the captured video image;

transmitting the encoded captured video image; and predicting a communication throughput using an effective throughput of transmission of the captured video image.

* * * * *